3,783,002
METHOD FOR COATING STEEL
Robert F. Purcell and David K. Sausaman, Terre Haute,
Ind., assignors to Commercial Solvents Corporation
No Drawing. Filed Jan. 14, 1972, Ser. No. 218,018
Int. Cl. B32b 15/08; B44d 1/36
U.S. Cl. 117—75
12 Claims

ABSTRACT OF THE DISCLOSURE

A process for coating steel by applying thereto a monomer or partial polymer of a vinyl oxazoline, represented by the formula

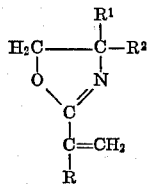

where R is an alkyl or alkenyl group of 1 to 20 carbon atoms and $R^1$ and $R^2$ are selected from the group consisting of methyl, ethyl, hydroxymethyl, or the acyloxymethyl group represented by the formula

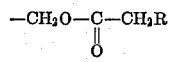

or the vinyl acyloxymethyl group represented by the formula

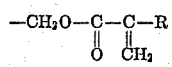

heating to effect further polymerization, applying thereto a solution or dispersion of a vinyl halide polymer, copolymer, or terpolymer and heating to effect evaporation of the solvent or coalescence of the dispersion.

BACKGROUND OF THE INVENTION

This invention relates to an improved method for coating steel. In a particular aspect this invention relates to a method for coating steel with a vinyl chloride polymer, copolymer or terpolymer and heating to effect the finished coating.

It is known to employ polymers and copolymers of vinyl chloride as a protective coating on steel and the steel so coated has many desirable properties. However, the use of such coatings has been disadvantageous because vinyl chloride polymers and copolymers are sensitive to the presence of ions of iron and undergo degradation when heated. Therefore, vinyl chloride-based solutions and dispersions applied to ferrous metals cannot be heated at elevated temperatures. Drying of solutions by evaporation at ambient temperatures requires a substantially longer drying time. Hence the output from the assembly line of vinyl coated articles is greatly reduced as compared with coated articles which can be force dried. Accordingly, there has been a need for an improved method for coating steel with vinyl chloride polymers, copolymers and terpolymers so that coatings based on these polymers can be baked without risk of degradation.

SUMMARY OF THE INVENTION

It is an object of this invention to provide an improved method for coating steel.

It is another object of this invention to provide a method for protecting from degradation due to iron ion, vinyl chloride polymers and copolymers applied to steel.

It is yet another object of this invention to provide a method of coating steel with vinyl chloride polymers and copolymers whereby the coating can be baked.

Other objects will be apparent to those skilled in the art from the disclosure herein.

An improved method for coating the surface of a ferrous object with a vinyl chloride polymer or copolymer has been discovered. According to the present invention the ferrous surface to be coated is first coated with a base coat consisting essentially of a monomer or preferably a partial-polymer, including partial copolymers, of a vinyl oxazoline, or a solution thereof, corresponding to the formula

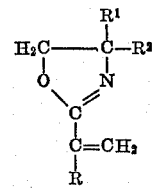

where R is an alkyl or alkenyl group of 1 to 20 carbon atoms and $R^1$ and $R^2$ are selected from the group consisting of methyl, ethyl, hydroxymethyl, or the acyloxymethyl group represented by the formula

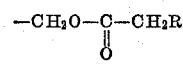

or the vinyl acyloxymethyl group represented by the formula

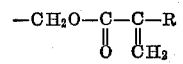

wherein R has the same meaning defined above. A solution or a dispersion of particles of the vinyl chloride polymer or copolymer is then applied to the vinyl oxazoline substrate and baked at a temperature of about 250–450° F., thereby evaporating the solvent from the solution or coalescing the particles of the dispersion.

DETAILED DISCUSSION

The vinyl oxazoline monomer or partial polymer can be prepared by any suitable method, many of which are known, e.g. the method of R. F. Purcell, U.S. Pats. Nos. 3,248,397 and 3,336,145, which are incorporated herein by reference. Many of these monomers are commercially available and the usual grade of commerce is suitable for the practice of this invention. The vinyl oxazolines wherein $R^1$ and/or $R^2$ is vinyl acyl oxymethyl as hereinbefore set forth, can be prepared by the method of W. F. Runge, U.S. Pat. 3,535,332, which is incorporated herein by reference.

Mixtures of vinyl oxazolines are equally as suitable as relatively pure compounds. The preferred vinyl oxazolines are those wherein R is an alkyl or alkenyl group of 1 to 6 carbon atoms. When R is 7–20 carbon atoms, it is preferably an alkenyl group. The particularly preferred vinyl oxazolines are those wherein R is an alkyl group of 1–3 carbon atoms, e.g. 4-ethyl-4-propionyloxymethyl-2-isopropenyl-2-oxazoline. Others suitable for the practice of this invention include but are not limited to:

4-ethyl-4-hydroxymethyl-2-isopropenyl-2-oxazoline
4-methyl-4-hydroxymethyl-2-isopropenyl-2-oxazoline
4-methyl-4-propionyloxymethyl-2-isopropenyl-2-oxazoline
4-methyl-4-(2-ethenyl)propionyloxymethyl-2-isopropenyl-2-oxazoline
4-ethyl-4-(2-ethenyl)propionyloxymethyl-2-isopropenyl-2-oxazoline
4,4-bis(hydroxymethyl)-2-(1-ethenylpropyl)-2-oxazoline
4,4-bis(octadecenoyloxymethyl)-2-(1-ethenylheptadecenyl)-2-oxazoline.

Partial homopolymers of the foregoing vinyl oxazolines are preferred for the practice of this invention but copolymers are also suitable, e.g. a copolymer of an ethylenically unsaturated monomer having a terminal

group, e.g. copolymers of styrene, acrylate esters, methacrylate esters and the like. However, they become less and less effective as the concentration of vinyl oxazoline decreases. Accordingly, the preferred copolymers contain at least about 5%, preferably about 50% or more of the vinyl oxazoline.

The term partial polymer as used herein is intended to mean a polymer of somewhat higher molecular weight than the starting monomer but capable of further polymerization at elevated temperatures or in the presence of a polymerization catalyst, many of which are known. Vinyl oxazolines can be partially polymerized in several ways. One method is to permit them to age at ambient temperatures for several weeks. Another method is to expose them to ultraviolet radiation for several hours, e.g. 5–15 hours. Yet another method is to heat the monomer at about 80° C. in the presence of a polymerization catalyst, about 1%, for about 30 minutes. Suitable catalysts include di-tertiary butyl peroxide, tertiary-butyl peroxypivalate, and dicumyl peroxide.

The vinyl oxazoline or partial polymer or copolymer thereof is applied to the steel surface by any convenient method, i.e. by wiping, roller, brush, spray, calendaring, etc., in a quantity sufficient to provide a baked film of preferably about <0.05–1 mil. The vinyl oxazolines are liquids and can be applied to the steel undiluted or as a solution. The partial polymers and copolymers are solids or semi-solids and are applied as solutions, e.g. at a concentration of 1–80% with any suitable solvent, many of which are known. Typical solvents which can be used for the vinyl oxazolines and the partial polymers and copolymers include, but are not limited to, lower alkanols, esters, ketones, aliphatic and aromatic hydrocarbons, nitroalkanes and chlorinated hydrocarbons. Preferred solvents include 2-nitropropane, toluene and xylene. It is not intended that the invention be limited as to the method of applying the vinyl oxazoline or partial polymer, nor limited as to the nature of the solvent, nor limited as to the concentration of oxazoline in the solvent.

The steel article coated with the vinyl oxazoline is heated to about 250–450° F. for a period of time sufficient to cause it to further polymerize. The heating, or baking step, is well known in the art of coating steel and any of the known methods are suitable for the practice of this invention. For example, the heating step can be effected by passing the article into a heated oven, or passing the steel over a flame or an electrically-heated element, etc. A heating period of 5–30 seconds or more is generally sufficient.

The steel article is then permitted to cool, e.g. to below about 60° C., preferably about 30°. A solution or dispersion (i.e. an "organosol" or "plastisol") of vinyl chloride polymer or copolymer is then applied by any suitable method, some of which were set forth above, in an amount sufficient to provide a dried film of about 1–2 mils or more as desired; the steel article is then again heated to 250–450° F. for a period of time sufficient to evaporate the solvent, when the polymer is applied as a solution, or to coalesce the film when applied as a dispersion, i.e. generally 0.5 to 5 min.

The terms "steel article" and "ferrous surface" are intended to mean articles of steel, iron and alloys thereof, including but not limited to carbon steel, stainless steel, monel metal, wrought iron, cast iron, and the like, having a significant iron content, i.e. sufficient to cause degradation of vinyl halide polymers at elevated temperatures.

Suitable vinyl chloride polymers and copolymers include but are not limited to those generally designated "coating" resins. Generally they consist of vinyl chloride, copolymers of vinyl chloride 75–98%, vinyl acetate 2–25% and maleic acid, 0–2%. Also copolymers of vinyl chloride-acetate with the vinyl oxazolines of the present invention are suitable (see Purcell 3,248,397).

Other coating resins include terpolymers of vinyl chloride 88–92% with vinyl acetate 3–5% and vinyl alcohol 5–7%; vinyl chloride 75–85% with vinyl acetate 14–20%, and glycidyl methacrylate 1–5%; vinyl chloride 40–80% and vinylidene chloride 20–60%; vinyl chloride and mono- or dibutyl acid maleates, or mixture thereof having inherent viscosities of from about 0.2 to 1.8. It is not intended that the practice of this invention be limited to any particular vinyl chloride polymer or copolymer because the invention can advantageously be used with any such polymer which deteriorates in the presence of ions of iron.

Solvents for the above vinyl copolymers are well known in the art. They include ketones, i.e. methyl ethyl ketone, methyl isobutyl ketone, cyclohexanone, tetrahydrofuran, mixtures of aromatic hydrocarbons and nitroalkanes, esters, chlorinated hydrocarbons, etc. The formulation and use of such solutions are well-known in the art and it is not intended that the practice of this invention be limited to any particular vinyl chloride polymer or copolymer or solution thereof.

The practice of this invention is not limited to solutions of vinyl chloride polymers and copolymers, but is equally applicable to dispersions. Generally, these dispersions consist of comminuted high molecular weight vinyl chloride polymers dispersed in a volatile medium, e.g. an aliphatic hydrocarbon (a composition commonly designated "organosols"), or a non-volatile plasticizer, e.g. dioctyl phthalate (a composition commonly designated a "plastisol"). Upon heating, the particles coalesce, and, in the case of organosols, the medium evaporates.

The invention will be better understood with reference to the following examples. It is understood, however, that the examples are intended for illustration only, and it is not intended that the invention be limited thereby.

EXAMPLE 1

A film of <0.1 mil thickness of 4-ethyl-4-propionyloxymethyl-2-isopropenyl-2-oxazoline was applied by wiping to one half of a steel D-panel. It was polymerized by baking for 1 minute at 400° F.

A solution of a copolymer of vinyl chloride and butyl maleate was applied over the entire panel in a quantity sufficient to form a dry film, after evaporation of solvent, of 0.6±0.2 mil thickness. The vinyl chloride was in a ratio of 3:1 to the butyl maleate, which consisted of dibutyl maleate and mono-butyl maleate in a ratio of 4:1 (Exon 470 manufactured by Firestone Tire and Rubber Company was the copolymer used). It was dissolved in a mixture of toluene and methyl isobutyl ketone in about a 1:1 ratio thereby forming a solution containing 20% by weight of solids.

The coated panel was baked for 15 min. at 400° F. The vinyl copolymer coating over the vinyl oxazoline was intact, though moderately discolored, whereas the vinyl copolymer applied to bare steel was totally degraded, black in color and lacked film integrity.

EXAMPLE 2

The experiment of Example 1 was repeated in all essential details except that the vinyl oxazoline was applied to the steel in the form of a 50% by weight solution to cyclohexane. The vinyl chloride-maleate copolymer was protected by the oxazoline during the baking step.

EXAMPLE 3

The experiment of Example 1 was repeated in all essential details except that 4-ethyl-4-hydroxymethyl-2-isopropenyl-2-oxazoline was substituted for 4-ethyl-4-propionyloxymethyl-2-isopropenyl-2-oxazoline. The vinyl chloride-maleate copolymer was protected by the oxazoline during the baking step.

EXAMPLE 4

The experiment of Example 3 was repeated in all essential details except that the vinyl oxazoline was applied as a 50% by weight solution in cyclohexane. The vinyl chloride-maleate copolymer was protected by the oxazoline durnig the baking step.

EXAMPLE 5

The experiment of Example 1 was repeated in all essential details except that the vinyl oxazoline film applied to the steel panel was polymerized by passing the panel through the flame of a Fisher high temperature gas burner for about 2 seconds. The coated side of the panel was exposed to the flame about 2 inches above the burner orifice.

After the panel had cooled, the vinyl chloride-maleate copolymer of Example 1 was applied and the panel was baked for 15 minutes at 400° F. The portion of the polyvinyl chloride-maleate protected by the oxazoline polymer was intact and only slightly discolored. The unprotected portion of the polyvinyl chloride-maleate film was totally degraded, black in color and lacked film integrity.

EXAMPLE 6

The experiment of Example 5 was repeated in all essential details except that 4-ethyl-4-hydroxymethyl-2-isopropenyl-2-oxazoline was substituted for 4-ethyl-4-propionyloxymethyl-2-isopropenyl-2-oxazoline. The oxazoline protected the polyvinyl chloride-maleate film from degradation.

EXAMPLE 7

A thin film of a crude vinyl oxazoline reaction mixture was applied to one half of a steel panel by wiping. The reaction mixture consisted of 4-ethyl-4-propionyloxy methyl-2-isopropenyl-2-oxazoline, 60%; 4-ethyl - 4 - (2-ethenyl)propionoxymethyl-2-isopropenyl - 2 - oxazoline, 20%; 4-ethyl-4-hydroxymethyl-2-isopropenyl-2-oxazoline, 10%; and unreacted 4-ethyl-4-hydroxymethyl-2-ethyl-2-oxazoline, 10%. Percentages are mole percent. The panel was exposed to ultraviolet radiation at a distance of 12 inches from 3 forty-watt U-V tubes having a peak output at 3654 A. for 7 hours, thereby polymerizing the vinyl oxazoline.

A 20% by wt. solution in a 1:1 mixture of methylsiobutyl ketone and toluene of a vinyl chloride/vinyl acetate/maleic acid terpolymer having a ratio of 84:15:1 (the resin used was Bakelite vinyl resin VMCC manufactured by Union Carbide Corporation, New York) was applied to the panel in an amount sufficient to provide a dry film of about 0.6 mil after evaporation. The coated panel was baked for 7 min. at 350° F. The vinyl terpolymer protected by the vinyl oxazoline polymer was intact and only slightly discolored. The unprotected polymer was totally degraded, black in color, and lacked film integrity.

EXAMPLE 8

A sample of 4-ethyl-4-propionyloxymethyl-2-isopropenyl-2-oxazoline was partially polymerized by permitting it to age at ambient temperature for about 2 weeks. It was of low molecular weight and had a soft, tacky, rubbery consistency. It was dissolved in a 3:1 mixture of 2-nitropropane and methanol at a concentration of 15%. An amount sufficient to provide a dry (by evaporation) film thickness of <0.1 mil was drawn down on one-half of a steel panel. The panel was then baked for 5 min. at 350° F. and allowed to cool.

The vinyl terpolymer solution of Example 7 was applied in an amount sufficient to provide a dry film thickness (by evaporation) of about 0.6 mil over the entire panel. It was then baked for 7 minutes at 350° F.

The unprotected vinyl film was severely degraded, black, and without film integrity. The protected vinyl film was unaffected and wholly intact.

EXAMPLE 9

The experiment of Example 8 was repeated in all essential details except that a copolymer of methylmethacrylate, 80 parts and 4-ethyl-4-propionyloxymethyl-2-isopropenyl-2-oxazoline, 20 parts, was substituted for the vinyl oxazoline.

The unprotected vinyl film was severely degraded, black, and without film integrity. The protected vinyl film was unaffected and wholly intact.

EXAMPLE 10

The experiment of Example 1 is repeated in all essential details except that 4-methyl-4-(2-ethenyl)propionoxymethyl-2-isopropenyl-2-oxazoline was used as the vinyl oxazoline. The protected vinyl cholride-maleate film is clear and unaffected by heating, but the unprotected film is black and lacking in film integrity.

EXAMPLE 11

Half of a steel panel was coated by wiping with a vinyl oxazoline ester prepared from tall oil acids and tris-(hydroxymethyl)aminomethane (Chemacoil TA–100 manufactured by McWhorter Chemical Company). Tall oil acids consist largely of $C_{18}$ unsaturated acids of which oleic acid predominates. Hence the vinyl oxazoline ester consisted principally of 4,4-bis(octadecenoyl)oxymethyl)-2-(1-ethenylheptadecenyl)-2-oxazoline. The thickness of the coating was about 0.2 mil. The coated panel was passed through a high-temperature flame as described in Example 5.

The entire panel was then coated with the same vinyl chloride resin solution described in Example 7.

It was force dried by baking. The portion protected by the vinyl oxazoline was slightly discolored but the film was intact whereas the unprotected portion was black, totally degraded and without film integrity.

EXAMPLE 12

The experiment of Example 11 was repeated in all essential details except that the vinyl oxazoline was not heat-cured before applying the vinyl chloride coating. It provided satisfactory protection for the vinyl chloride.

EXAMPLES 13–17

The experiment of Example 1 is repeated in all essential details except that the vinyl oxazoline identified below is substituted for the vinyl oxazoline of Example 1.

| Example No. | Vinyl oxazoline |
| --- | --- |
| 13 | 4-ethyl-4-hydroxymethyl-2-isopropenyl-2-oxazoline. |
| 14 | 4-methyl-4-hydroxymethyl-2-isopropenyl-2-oxazoline. |
| 15 | 4-methyl-4-(2-ethenyl)propionyl)oxymethyl-2-isopropenyl-2-oxazoline. |
| 16 | 4,4-bis(hydroxymethyl)-2-(1-ethenylpropyl)-2-oxazoline. |
| 17 | 4,4-bis(octadecenoyloxymethyl)-2-(1-ethenylheptadecenyl)-2-oxazoline. |

What is claimed is:

1. In a process for coating a ferrous surface with a base coat, heating to 250–400° to polymerize said base coat, cooling, then applying thereto a vinyl chloride polymer or copolymer as a solution in a volatile solvent or as a dispersion in a non-solvent, heating to evaporate said solvent or coalesce said dispersion, the improvement consisting of using as said base coat a vinyl oxazoline or partial polymer thereof or a partial copolymer of said oxazoline with an ethylenically unsaturated monomer having a terminal

group, said oxazoline being represented by the formula

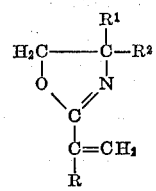

wherein R is an alkyl or alkenyl group of from 1 to 20 carbon atoms, $R^1$ and $R^2$ are methyl, ethyl, hydroxymethyl or an acyloxymethyl group represented by the formula

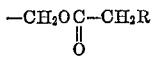

or a vinyl acyloxymethyl group represented by the formula

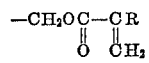

and $R^1$ and $R^2$ can be the same or different.

2. The process of claim 1 wherein $R^1$ and $R^2$ of said oxazoline are methyl.

3. The process of claim 1 wherein $R^1$ and $R^2$ of said oxazoline are hydroxymethyl.

4. The process of claim 1 wherein $R^1$ of said oxazoline is ethyl and $R^2$ is hydroxymethyl.

5. The process of claim 1 wherein $R^1$ and $R^2$ of said oxazoline are acyloxymethyl corresponding to the formula

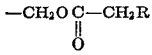

6. The process of claim 1 wherein $R^1$ and $R^2$ of said oxazoline are vinylacyloxymethyl corresponding to the formula

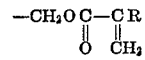

7. The process of claim 1 wherein $R^1$ is methyl or ethyl and $R^2$ is acyloxymethyl represented by the formula

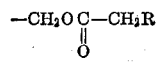

8. The process of claim 1 wherein $R^1$ of said oxazoline is methyl or ethyl and $R^2$ is vinylacyloxymethyl corresponding to the formula

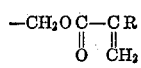

9. The process of claim 1 wherein said oxazoline is 4-ethyl-4-propionyloxymethyl-2-isopropenyl-2-oxazoline.

10. The process of claim 1 wherein said base coat is said vinyl oxazoline.

11. The process of claim 1 wherein said base coat is said partial polymer of said vinyl oxazoline.

12. The process of claim 1 wherein said base coat is said copolymer of an ethylenically unsaturated monomer having a terminal

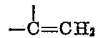

group.

References Cited
UNITED STATES PATENTS

| | | | |
|---|---|---|---|
| 3,553,124 | 1/1971 | Donatello et al. | 117—75 X |
| 3,585,160 | 6/1971 | Miller et al. | 117—75 X |
| 3,010,846 | 11/1961 | Bach | 117—75 |
| 3,285,772 | 11/1966 | Rietz et al. | 117—75 |
| 3,497,466 | 2/1970 | Markulin et al. | 117—75 X |
| 3,609,161 | 9/1971 | Dowbenko | 260—307 F |
| 3,488,294 | 1/1970 | Annand et al. | 260—307 FX |
| 3,336,145 | 8/1967 | Purcell | 106—176 |

RALPH HUSACK, Primary Examiner

U.S. Cl. X.R.
117—93.31, 132 C

PO-1050
(5/69)

UNITED STATES PATENT OFFICE
CERTIFICATE OF CORRECTION

Patent No. 3,783,002        Dated January 1, 1974

Inventor(s) R. F. Purcell and D. K. Sausaman

It is certified that error appears in the above-identified patent and that said Letters Patent are hereby corrected as shown below:

Column 5, line 9, "durnig" should be --during--

Column 5, line 48, "methylsio-" should be --methyliso--
Column 6, line 19, "cholride" should be --chloride--

Signed and sealed this 20th day of August 1974.

(SEAL)
Attest:

McCOY M. GIBSON, JR.
Attesting Officer

C. MARSHALL DANN
Commissioner of Patents